April 1, 1952     G. J. BUTTERWORTH     2,590,930
CIRCUIT CONTROL FOR WELL SURVEYING INSTRUMENTS
Filed Feb. 16, 1949     2 SHEETS—SHEET 1

INVENTOR.
GILBERT JAMES BUTTERWORTH
BY
ATTORNEYS

April 1, 1952 G. J. BUTTERWORTH 2,590,930
CIRCUIT CONTROL FOR WELL SURVEYING INSTRUMENTS
Filed Feb. 16, 1949 2 SHEETS—SHEET 2

INVENTOR.
GILBERT JAMES BUTTERWORTH
BY Dunsen + Harding
ATTORNEYS

Patented Apr. 1, 1952

2,590,930

UNITED STATES PATENT OFFICE 2,590,930

CIRCUIT CONTROL FOR WELL SURVEYING INSTRUMENTS

Gilbert James Butterworth, Chester, Pa., assignor to Sperry-Sun Well Surveying Company, Philadelphia, Pa., a corporation of Delaware Application February 16, 1949, Serial No. 76,803

4 Claims. (Cl. 346—33)

This invention relates to a well surveying instrument, and has particular reference to the surveying of bore holes by the so-called go-devil method.

In the patent to Roland Ring 2,246,319, dated June 17, 1941, there is described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent, the operation of said instrument may be described as follows:

In the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with surveying instruments involves their being dropped freely through a drill stem so that they come to rest in a position adjacent the bit. During this location in a position of rest, a record is made under the control of suitable timing means, and the instrument is then recovered when the bit is brought to the surface. Generally speaking, such go-devil records are made at a time when it is necessary to bring the bit to the surface to check the progress of the drill.

In the use of said Ring instrument in go-devil fashion, the motion of the instrument through the drill stem prevents the making of any record during its fall, and a record is then made by holding the drill stem stationary for a sufficient period of time while the instrument rests adjacent to the bit. If the drill stem was then raised and dismantled by continuous work of the drilling crew, the instrument would be subject to sufficiently continuous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workman, after raising the drill stem part way, will take a short period of rest before proceeding further. If an instrument of the Ring type is in the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to the provision of means for initiating the recording action when the instrument strikes the bottom of the bore hole or drill stem and terminating the recording action after a desired recording time has elapsed, being particularly useful for termination of the recording action following the completion of a single record or a series of records made in go-devil fashion.

This and other objects of the invention, particularly relating to details of operation and construction, will become apparent from the following description, read in conjunction with the accompanying drawing in which:

Figures 1B, 1C and 1D are longitudinal sectional views taken through the upper portions of the instrument;

Figure 1A:
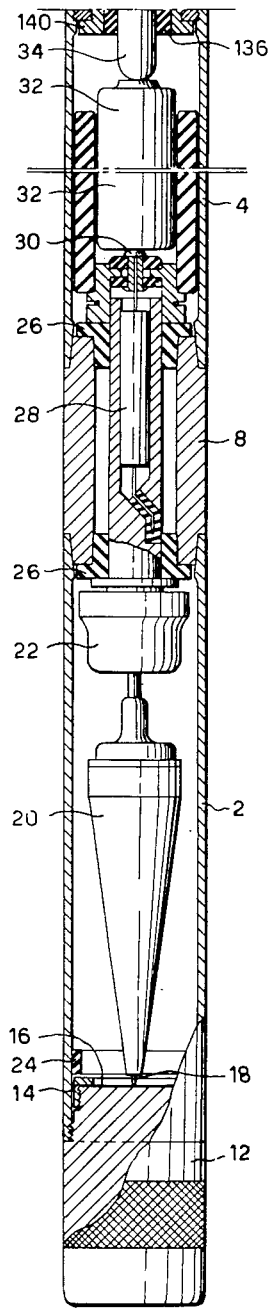
Figure 1A is a longitudinal sectional view through the lower portion of a well surveying instrument.
Figure 1B:
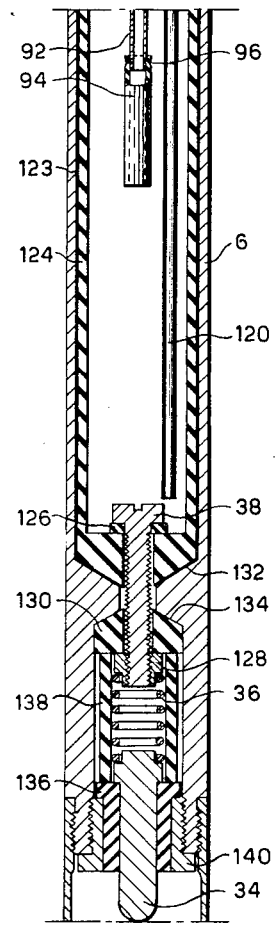
Figure 3:
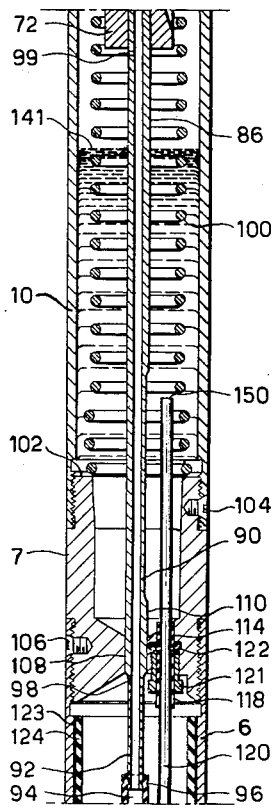
Figure 3 is an enlarged section of a portion of the lower coupling showing the passage of the contact rod therethrough.
Figure 3:
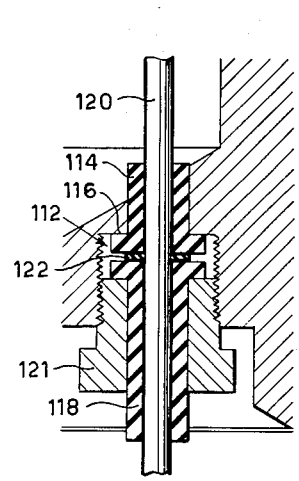
Figure 2:
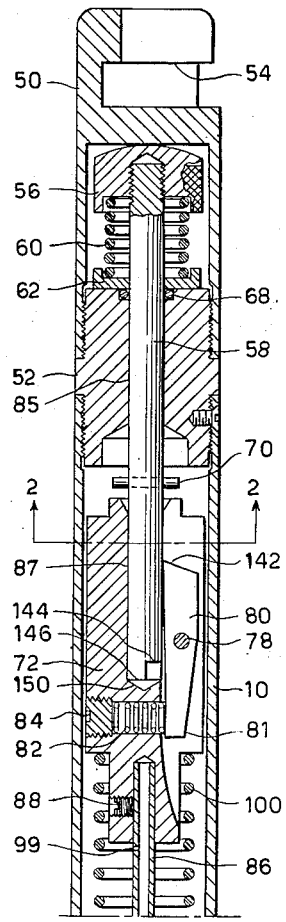
Figure 2 is a transverse section taken on the plane indicated at 2—2 in Figure 1D.
Figure 2:
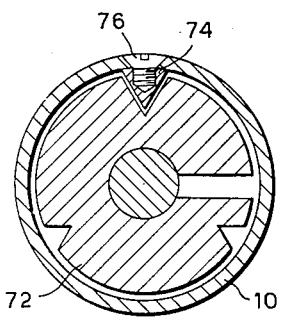

The instrument illustrated in the drawing is basically of the type disclosed in said Ring patent and comprises fluid-tight casings 2, 4, 6 and 10 joined together. Casings 2 and 4 are joined by coupling 8, casings 6 and 10 are joined by coupling 7 and, casings 4 and 6 are joined directly together. Casing 10 is joined to upper cap 50 by coupling 52. All casings and couplings are threaded together. Threaded into the bottom of the lowermost casing 2 is a plug 12 on which may be secured the record member 16 by means of a threaded ring 14 provided with a flange overlapping the edge of the record member. This record member, as described in detail in said Ring patent, preferably comprises a sheet of paper containing a colored material which, upon the passage of an electrical current while it is moist will be marked with a white spot by reason of the formation of alkali at a cathode provided by a metallic point 18 slidable within a pendulum 20 mounted for universal pivotal movement in a bearing arrangement 22. An insulating ring 24 prevents short circuiting by preventing contact of the pendulum with the metallic wall of the casing 2.

The bearing 22 has a mounting which is insulated by means of insulating bushings 26 from the casing of the instrument and interposed electrically between the bearing and a contact point 30 is a current limiting or stabilizing resistor 28 of rather high resistance, for example of the order of 100,000 ohms. Engaging the point 30 is the lowermost of one or more batteries indicated at 32 insulated by a suitable sleeve from the tube 4. These batteries are arranged in series with the positive pole in the uppermost position engaged with the pin 34 urged downwardly by a spring 36, which engages a screw 38, the pin 34 and screw 38 and spring 36 being insulated from the metallic portions of the apparatus by means of suitable insulating bushings as will be hereinafter described.

Up to this point, the instrument is substantially conventional and as illustrated in said Ring patent. In accordance with the Ring patent, the equivalent of the pin 38 would be grounded to the casing of the instrument when in operation so as to close the circuit through the batteries, the resistance, the pendulum and the record member. In the present instance, a liquid mercury switching means is interposed in the circuit. This switching means provides a timed contact interval, which is initiated by the impact of the instrument with the lower end of the drill stem. On the completion of the timed interval the contact is broken.

In the following description of the parts comprising the mercury switching means, it will be understood that all parts should be construed as made from austenitic stainless steel or other alloy resistant to oxidation and resistant to amalgamation with the mercury, with the following exceptions. The springs may be made of stainless steel wire, piano wire, or other suitably resistant spring material. Set screws may be ordinary steel set screws, and the insulating parts referred to as plastic may be of any thermosetting plastic material or laminated fabric impregnated with phenolic or other type of material having suitable properties including resistance to temperatures such as would be encountered within a drill hole.

To accomplish the liquid mercury switching there is provided the previously mentioned casings 6 and 10 joined by lower coupling 7, the upper cap 50 being joined to the casing or upper chamber 10 by the upper coupling 52. The cap 50 is provided with key way 54 engageable with the head of a bolt secured in the usual outer protective casing of the instrument to provide a support for the instrument.

Inside of the cap is knob 56 into which is threaded a shaft 58. The knob is urged upward against the cap by shaft spring 60 which seats both in the knob and against washer 62. Below the washer 62 is a neoprene O-ring 68 forming a seal between shaft 58 and the upper coupling 52. The shaft 58 is provided with a suitable pin 70 which, upon removal of cap 50, limits the upward travel of shaft 58 through the upper coupling 52 by coming in contact with the lower end of the upper coupling.

Slidably mounted within the casing 10 is weight member 72. Weight guide 74 held in position by set screw 76 serves to prevent the weight from rotating within the casing and limits the motion of the weight to linear vertical travel. Mounted in weight member 72 on latch pin 78 is latch member 80. Also mounted within the weight member is latch spring 82 which is held in position by latch spring set screw 84. It will be noted that the shaft 58 extends through a bore 85 in the upper coupling and a bore 87 in the weight member 72 with a sliding fit.

Mounted in a bore in the lower end of the weight member is timing tube 86 held in position by set screw 88. The timing tube for a portion of its length has a flat face machined on its exterior as indicated at 90. The lower end of the tube is turned down to a reduced outside diameter as indicated at 92, and has mounted thereon a plastic insulating tube 94 which is both cemented to the timing tube and crimped into a groove 96. Also contained in the wall of the timing tube are radial bores 98 and 99.

The weight member 72 rests on weight spring 100 which in turn rests on the upper face 102 of the lower coupling member. The lower coupling, which is locked in position with the casing 10 by set screw 104 and in position with the lower casing 6 by set screw 106, contains a central bore 108 of reduced diameter. This bore diameter is such as to provide a snug sliding fit with the timing tube portion having normal outside diameter as indicated at 110.

Also contained within the restricted portion of the lower coupling is the off-center passage indicated at 112. Through this passage is inserted contact rod 120 which has soldered thereto a washer 122 serving as a stop for the two plastic insulating bushing members 114 and 118. The insulating bushing members are cemented to the contact rod and the entire rod, except for its end faces, is coated with an insulating cement such as glyptal or other suitable material. The contact rod and bushing assembly are inserted into the bore 112 and held in position with the flange of bushing 114 pressed against the shoulder 116 of the off-center hole by the action of contact rod screw 121. Thus the upper end of the contact rod 120 extends into the space within casing 10 and the lower end of the rod extends into the space within casing 6.

Plastic liner 124 is cemented within the upper bore in casing 6 with a layer of insulating cement 123 such as glyptal or other suitable material. The plastic liner is also held in position by contact screw 38 which passes through neoprene sealing washer 126 and is threaded into plug member 128 thus drawing the plastic liner 124 and the plastic spacer 130 together against the shoulders 132 and 134 respectively in the casing 6.

The plunger 34 is urged outward against plunger bushing 136 by the action of plunger contact spring 36, and the plastic plunger bushing 136 is held in position against plastic contact spring spacer 138 by bushing nut 140.

The instrument with parts in relative positions as shown in the figures and with a quantity of mercury in the casing 10 to approximately the level indicated at 141 is dropped into a drill stem. When the timing tube portion 110 is in the position shown, the mercury cannot flow through the bore 108. The impact occurring when the instrument strikes its seat in the bottom of the drill stem causes the weight member 72 to move downwardly carrying with it latch member 80. When the downward travel of the weight and the latch member is such that the upper corner 142 of the latch member passes below the lower end notch 144 of shaft 58, the action of the latch spring 82 causes the latch member to rotate around latch pin 78 and upper corner 142 of the latch member moves under the lower end of the shaft or the shoulder at 144 and prevents the weight member from returning upwardly to its normal position by the action of weight spring 100. The movement of the latch is arrested when the lower corner 81 of the latch member contacts the wall of casing 10.

In this position of the weight, the position of timing tube 86 is such that the portion of the tube with the plane face 90 lies within reduced bore 108 of the coupling member.

The mercury in casing 10 then passes slowly into the space within the plastic liner 124 through the space adjacent to the plane face 90 of the timing tube, the opening provided being very small in order to restrict the rate of flow. The air in the space within the plastic liner 124 displaced by the mercury passes upward through the central bore in timing tube 86 and through bore 99 and replaces the mercury previously existing inside of casing 10.

As the mercury level in plastic liner 124 rises, the mercury establishes contact between the lower end of the contact rod and the upper end of contact screw 38. When this occurs, a circuit is completed through the instrument allowing current to flow from the batteries 32 through the plunger 34, the contact spring 36, the plug 128, the contact screw 38, the mercury pool in the plastic liner, the contact rod 120, the mercury pool in casing 10 to the wall of casing 10 and from the casing 10 to the coupling 7, the casings 6 and 4, the coupling 8, the casing 2 to end cap 12. From the end cap 12 to current passes through record member 14 at the point of contact of pin 18 in pendulum 20, thus marking the record member. From the pendulum the current passes into bearing member 22, to the resistor 28, the contact point 30 and into battery 32, thus completing the circuit.

After a period of time determined by the quantity of mercury originally existing above the upper end 150 of the contact rod and the size of the opening through bore 108 provided by the removal of the metal from the face 90 of the timing rod, the mercury level in the upper chamber will have lowered to a point below the uninsulated end 150 of the timing rod and the circuit will be broken. This period of time is sufficient for a record to be made on record member 14.

When the instrument is retrieved resetting for the next operation is accomplished as follows: The upper cap 50 is unscrewed from upper coupling 52 allowing the knob 56 to be urged upward by shaft spring 60 until motion is arrested by the contact of stop pin 70 with the lower face of the upper coupling member. By a manual rotation of the knob the latch spring, if it has caught under the end face 146 of shaft 58, will be caused to drop into notch 144. The notch 144 has rounded sides such that as the knob 56 is rotated, rotating the shaft 58, the upper corner 142 of the latch is cammed out of the notch and the weight member is allowed to move upward in response to the urging of spring 100 and is finally restrained by contact of the lower end 150 of weight bore 86 with the lower end 146 of shaft 58. In this position of the weight the timing tube portion of reduced outside diameter 92 assumes a position within the reduced bore 108 of the lower coupling. The outside diameter of the timing tube at 92 is considerably less than the inside diameter of the bore 108 and thus, when the instrument is inverted, the mercury in the receiving chamber flows past the tube into the upper chamber and the air in the upper chamber passes into the inside of the timing tube through bore 98 and passes through the inside of the tube back into the receiving chamber.

After sufficient time has lapsed for the mercury to have completely returned to the upper chamber, the cap 50 is screwed back on to the upper coupling 52. As the cap is replaced, the knob 56 is pressed downward by contact with the cap 50. Thus the shaft 58 presses weight member 72 downward against weight spring 100 and the timing tube assumes a position where the section 110 of maximum diameter seals off the bore 108 in the lower coupling and causes the mercury to be retained in the upper chamber regardless of the position of the instrument until the next operation of the instrument.

The arrangement illustrated is designed to prevent accidental closing of the circuit as a result of rotation, inclination, or lack of motion over an extended time interval, and after the timing interval is completed, the circuit cannot be reestablished as a result of rotation, inclination, lack of motion over an extended timing interval or as the result of additional impact or shock.

While the mercury control switch has been described specifically with the Ring type instrument, it will be evident that, inasmuch as the invention provides a timed electrical contact, it may be employed for actuating temperature measuring means, pressure measuring means, electric logging means or other electrically controlled well logging and surveying equipment which may be go-devilled into a bore hole.

It will be evident that various changes may be made in the specific embodiment of the invention particularly in the arrangement of the weight latching means for timing the mercury flow and the means for establishing electrical current flow and breaking that flow through the mercury pool without departing from the basic inventive concept involved.

What I claim and desire to protect by Letters Patent is:

1. A bore hole measuring instrument comprising a casing adapted to enter a bore hole, means for supporting recording means within said casing, means comprising an electrical circuit for effecting operation of said recording means in accordance with conditions existing adjacent to said casing, and means controlling flow of current in said circuit, said means comprising devices responsive to impact of said casing to effect said control, said devices including a weight member urged upwardly by a spring member, latching means latching the weight member in a downward position resulting from said impact, an orifice controlled by the position of the weight member and opened when the weight member is in said downward position, and a conductive fluid flowing through said orifice to establish electrical contact permitting said flow of current.

2. A bore hole measuring instrument comprising a casing adapted to enter a bore hole, means for supporting a record member within said casing, means comprising an electrical circuit for effecting marking of said record member in accordance with the positioning of said casing, and means for controlling the flow of current in said circuit, said control means comprising devices including a weight member responsive to impact of said casing to effect movement of a switching element for a predetermined time interval.

3. A bore hole measuring instrument comprising a casing adapted to enter a bore hole, means for supporting a record member within said casing, means comprising an electrical circuit for effecting marking of said record member in accordance with the position of said casing, and means for controlling the flow of current in said circuit, said control means comprising devices including a weight member responsive to impact of said casing, and means responsive to the operation of said weight member for establishing a flow of a fluid from a first chamber to a second chamber to effect said control.

4. A bore hole measuring instrument comprising a casing adapted to enter a bore hole, means for supporting a record member within said casing, means comprising an electrical circuit for effecting marking of said record member in accordance with the position of said casing, and means for controlling the flow of current in said circuit, said control means comprising devices including a weight member responsive to impact of said casing, and means responsive to the operation of said weight member for establishing a flow of a conductive fluid from a first chamber to a second chamber, said conductive fluid completing said electrical circuit during a predetermined time interval to effect said control.

GILBERT JAMES BUTTERWORTH.

REFERENCES CITED

The following references are of record in the file of this patent:

UNITED STATES PATENTS

| Number | Name | Date |
|---|---|---|
| 1,905,299 | McLaughlin et al. | Apr. 25, 1933 |
| 1,918,448 | Box et al. | July 18, 1933 |
| 2,219,512 | Cooper et al. | Oct. 29, 1940 |
| 2,412,976 | Emerson et al. | Dec. 24, 1946 |
| 2,415,249 | Kothny | Feb. 4, 1947 |
| 2,424,358 | Kothny | July 22, 1947 |